(12) United States Patent  
Nilsson (10) Patent No.: US 8,868,462 B2  
(45) Date of Patent: Oct. 21, 2014

(54) HUB AND SPOKES PIN VERIFICATION

(75) Inventor: Magnus Nilsson, Djursholm (SE)

(73) Assignee: Izettle Merchant Services AB, Stockholm (SE)

( * ) Notice: Subject to any disclaimer, the term of this patent is extended or adjusted under 35 U.S.C. 154(b) by 0 days.

(21) Appl. No.: 13/882,597

(22) PCT Filed: Mar. 13, 2012

(86) PCT No.: PCT/EP2012/001114  
§ 371 (c)(1),  
(2), (4) Date: Apr. 30, 2013

(87) PCT Pub. No.: WO2013/087126  
PCT Pub. Date: Jun. 20, 2013

(65) Prior Publication Data  
US 2014/0025579 A1    Jan. 23, 2014

Related U.S. Application Data

(60) Provisional application No. 61/595,867, filed on Feb. 7, 2012.

(51) Int. Cl.  
*G06Q 30/02* (2012.01)

(52) U.S. Cl.  
USPC .................. 705/44; 705/41; 705/54; 705/17; 705/64; 705/79; 235/380; 235/437; 713/717

(58) Field of Classification Search  
USPC .............. 705/41, 17, 44, 64, 54, 79; 235/380, 235/437; 713/171  
See application file for complete search history.

(56) References Cited

U.S. PATENT DOCUMENTS

| 6,098,053 | A  | * | 8/2000 | Slater .............................. 705/44 |
| 6,163,772 | A  | * | 12/2000 | Kramer et al. ................. 705/79 |
| 7,143,069 | B2 | * | 11/2006 | Lacivita et al. ................ 705/64 |
| 8,583,496 | B2 | * | 11/2013 | Yoo et al. ........................ 705/17 |
| 2002/0038287 | A1 | * | 3/2002 | Villaret et al. .................. 705/41 |

(Continued)

FOREIGN PATENT DOCUMENTS

| EP | 1 752 937 A1 | 2/2007 |
| GB | 2 396 472 A  | 6/2004 |

(Continued)

OTHER PUBLICATIONS

International Search Report, corresponding to PCT/EP2012/001114, mailed on Oct. 5, 2012.

(Continued)

*Primary Examiner* — Harish T Dass  
(74) *Attorney, Agent, or Firm* — Renner, Otto, Boisselle & Sklar, LLP.

(57) ABSTRACT

A method for conducting PIN authorized EMV payments using an ordinary mobile phone. The credit card payment is conducted using a merchant's device comprising a card reader and a mobile phone a payment server and a buyer's mobile phone. A PIN entry request is sent from the merchant's device to the buyer's device via the payment server. A secure application in the buyer's device is executed and a PIN code may be entered securely. The entered PIN code is either verified, via the payment server, against the credit card in said merchant's device or against a bank server. Thus, secure credit card payments can be performed using an ordinary unsecure mobile device's.

8 Claims, 5 Drawing Sheets

(56) References Cited

U.S. PATENT DOCUMENTS

| | | |
|---|---|---|
| 2002/0147913 A1 | 10/2002 | Lun Yip |
| 2009/0094458 A1* | 4/2009 | Dionisio ........................ 713/171 |
| 2010/0274726 A1* | 10/2010 | Florek et al. .................... 705/72 |
| 2011/0180598 A1* | 7/2011 | Morgan et al. ................. 235/380 |
| 2011/0202466 A1 | 8/2011 | Carter |
| 2012/0118956 A1* | 5/2012 | Lamba et al. .................. 235/437 |

FOREIGN PATENT DOCUMENTS

| | | |
|---|---|---|
| WO | 2006/029596 A1 | 3/2006 |
| WO | 2006029596 A1 | 3/2006 |
| WO | 2012/004395 A1 | 1/2012 |
| WO | 2012004395 A1 | 1/2012 |

OTHER PUBLICATIONS

Written Opinion, corresponding to PCT/EP2012/001114, mailed on Oct. 5, 2012.

Office Action dated Jan. 6, 2014, corresponding to EP 12 716 222.0.

* cited by examiner

HUB AND SPOKES PIN VERIFICATION

TECHNICAL FIELD

The invention relates in general to the field of secure electronic payment card transactions, and more particularly, to a method and a system for secure debit and credit card payments using mobile communication devices such as mobile phones.

BACKGROUND

Every day an incredible number of debit and credit card payments are made around the world, and the number of payments are steadily increasing.

EMV is the leading payment system specification for debit and credit cards on the market and was jointly developed by the companies Europay International, Mastercard International, and Visa International, hence the abbreviation EMV. To be able to develop a debit and credit card payment system that is capable of using standard EMV approved cards, it is essential that the payment system fulfill the EMV specification.

The majority of debit and credit card payments are still made in stores using bulky and stationary EMV approved point-of-sale (POS) terminals. However, in the last couple of years the interest, both from the public and from companies, of being able to make payments with portable hand-held devices such as mobile phones have grown rapidly. However, the mobile phone is not considered to be a secure device and would not fulfill the requirements for conducting an EMV payment. The main security issue is the input of the personal identification number (PIN) into the mobile phone which could be intercepted by a third party using for instance malicious software. Thus, finding a way to be able to make EMV approved secure debit and credit card payments using ordinary mobile phones are therefore highly sought after.

SUMMARY OF THE INVENTION

With the above description in mind, then, an aspect of the present invention is to provide a way to make EMV approved secure debit and credit card payments which seek to mitigate, alleviate, or eliminate one or more of the above-identified deficiencies in the art and disadvantages singly or in any combination.

A first aspect of the present invention relates to a method of conducting electronic credit card payments to a payment acquirer using a merchant's device, comprising a card reader and a mobile phone, a buyer's mobile device and a payment server, wherein said method comprising, initiating an electronic credit card payment transaction by executing a payment application in said merchant's device, entering sales information in said merchant's device, entering a credit card into said card reader of said merchant's device, entering buyer identification information and generating an PIN entry request in said merchant's device, transmitting an encrypted purchase message from said merchant's device to a payment server, wherein said encrypted purchase message comprising at least one of sales information, buyer identification information, PIN entry request and encrypted credit card information read from said credit card in said card reader, receiving and decrypting said encrypted purchase message in said payment server, determining buyer's contact information using said buyer's identification information in said decrypted encrypted purchase message, transmit a PIN code request to a buyer's mobile device based on said buyer's contact information, receiving said PIN code request in said buyer's mobile device, and launching a secure PIN entry application in said buyer's mobile device, entering PIN code in said secure PIN entry application, transmitting a PIN code block comprising encrypted said PIN code to said payment server, receiving said PIN code block in said payment server, determining if a verification of said PIN code is performed off-line or on-line, wherein said off-line verification comprising the steps, i. transmitting said PIN code block from said payment server to said merchant's device,
ii. decrypting said PIN code block and verifying said PIN code block against PIN information in said credit card,
iii. transmitting sales information from merchant's device to said payment server,
iv. transmitting said credit card information and said sales information from said payment server to a bank server,
v. verifying said credit card information and sales information in said bank server, wherein said on-line verification comprising the steps, i. transmitting said PIN code block, said credit card information and said sales information from said payment server to said bank server,
ii. verifying said PIN code, said credit card information and said sales information in said bank server, producing a verification message in said bank server based on said verification, transmitting said verification message to said payment server, generating a receipt message in said payment server based on received verification message, transmitting said receipt message to said buyer's mobile device and said merchant's device via said payment server, and displaying said receipt message in said buyer's mobile device and in said merchant's device completing said electronic debit or credit card payment.

The method of conducting electronic credit card payments wherein the step of entering PIN code in said secure PIN entry application may also comprise entering buyer security information and encrypting said buyer security information and including it in said PIN code block.

The method of conducting electronic credit card payments wherein the step of receiving said PIN code block in said payment server may also comprise decrypting said buyer security information at said payment server, and verifying said buyer security information against said buyer identification information.

The method of conducting electronic credit card payments wherein said buyer identification information may be any of: the buyer's mobile phone number, an e-mail address, postal address, a social security number, a signature, a one-time code, a pre-registered identification number, a photograph and biometric information.

The method of conducting electronic credit card payments wherein said step of launching a secure PIN entry application in said buyer's mobile device may entail launching an encrypted web interface that is uniquely encrypted for each PIN input occasion, or a dedicated web browser capable of decrypting the PIN input web component and ensuring secure input of the PIN code.

The method of conducting electronic credit card payments wherein said transmission between said merchant's device and said payment server, between said payment server and said buyer's mobile device, and between said payment server and said bank server may be encrypted using standard secure socket layer communication.

The method of conducting electronic credit card payments wherein said receipt message may be stored on the payment server, and is accessible by the buyer and/or the merchant using a web browser, the merchant's device or the buyer's mobile device.

A second aspect of the present invention relates to a system for conducting electronic credit card payments comprising a merchant's device, comprising a card reader and a mobile phone, a payment server, a buyer's mobile phone and a bank server, wherein said merchant's device, payment server, buyer's device and bank server having transceiver means and processing means for carrying out the steps set out in the first aspect above.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Embodiments of the present invention will be exemplified using a mobile communication device such as a mobile phone. However, it should be appreciated that the invention is as such equally applicable to electronic devices which have wired- and/or wireless radio communication capabilities. Examples of such devices may for instance be any type of mobile phone, laptop (such as standard, ultra portables, netbooks, and micro laptops) handheld computer, portable digital assistant, tablet computer, gaming device, accessories to mobile phones, etc. However, for the sake of clarity and simplicity, the embodiments outlined in this specification are exemplified with, and related to, mobile phones only.

Figure 1:
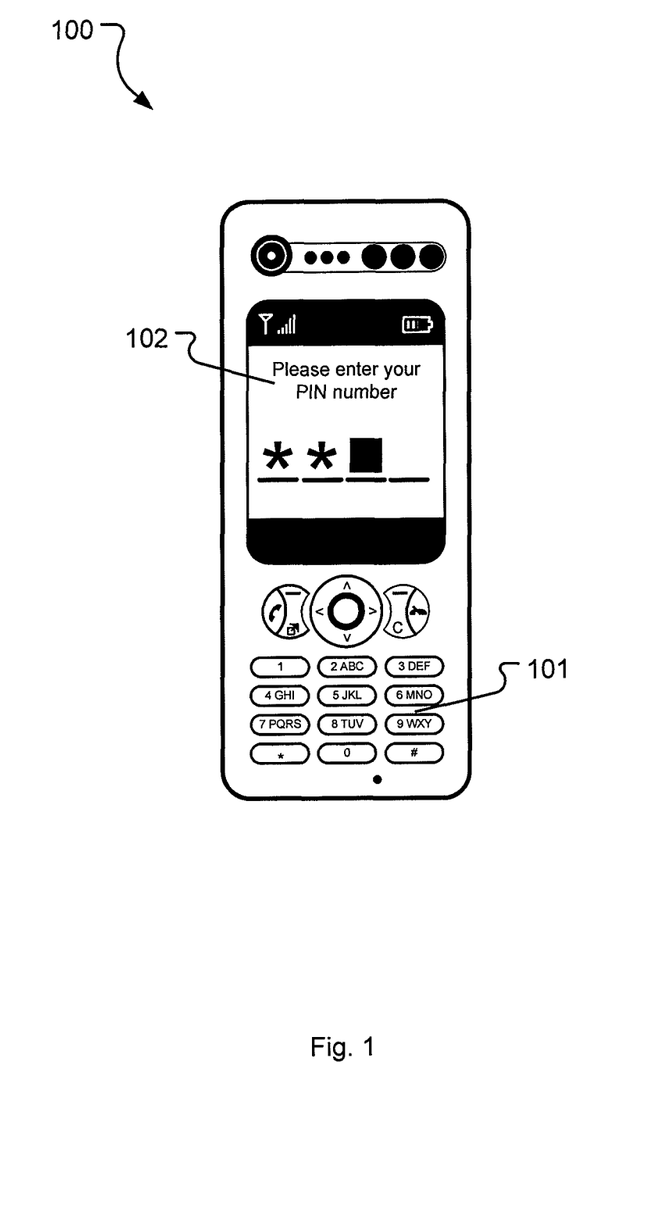
FIG. 1 shows a mobile phone for conducting PIN authorized EMV payments, according to an embodiment of the present invention.

The present invention relates to EMV approved debit and credit card payments using an ordinary mobile phone. From hereinafter the term credit card refer both to credit cards, debit cards, other type of electronic cards that may be used and/or functions as a debit or credit card. The term credit card may also include a piece of software that acts as a debit or credit card, or a computer based service that acts as a debit or credit card. FIG. 1 shows a typical mobile phone 100 with input means 101, which may be in the form of physical buttons or virtual buttons displayed in a display 102. The mobile phone may further have processing means (not shown), for running secure applications, and communication means (not shown) for connecting to other mobile communication devices and/or the Internet, either by wire or wirelessly.

It has been previously shown that credit card payments can be made secure and EMV approved using a specialized card reader device attachable to a mobile phone in the manner presented in the International patent application with the application number PCT/EP2010/066186 by the iZettle company. However, carrying out a PIN authorized EMV payment from a mobile phone not connected to a payment card reader device has not been possible since the PIN entry device, in this case the mobile phone, has been considered to be unsecure. The main security issue is the step of entering a PIN code (or some other sensitive identification information such as a signature or biometric information) using the mobile phone's keyboard. It is a well known fact that malicious software programs may infect the mobile phone and secretly record the entered sensitive identification information, such as a PIN code entered on the keyboard of the mobile phone, and thereafter relaying it to a criminal third party.

In general, an EMV payment with the payment card reader and a mobile phone is generally approved off-line, with the EMV card chip (inserted into the payment card reader) as PIN code reference, in order to gain speed. It is also possible to authorize the EMV payment on-line, with the bank as PIN reference, wherein the PIN code is transferred directly to the bank server in an encrypted block of data. The payment may be also carried out and verified by the written signature of the user.

However, the security requirements (protection against attempts to tamper with the device to gain access to the PIN code) disqualify all modern mobile phones to act as a secure PIN entry device for PIN code entry. Thus, it has until now not been possible to make a secure PIN authorized EMV payments unless both the card reader device and the PIN entry device are secure devices. However, the present invention disclosed below presents a method and a system that allows for an ordinary mobile phone to conduct a secure PIN authorized EMV payment in combination with the well known payment method disclosed in the International patent application with the application number PCT/EP2010/066186.

Figure 2:
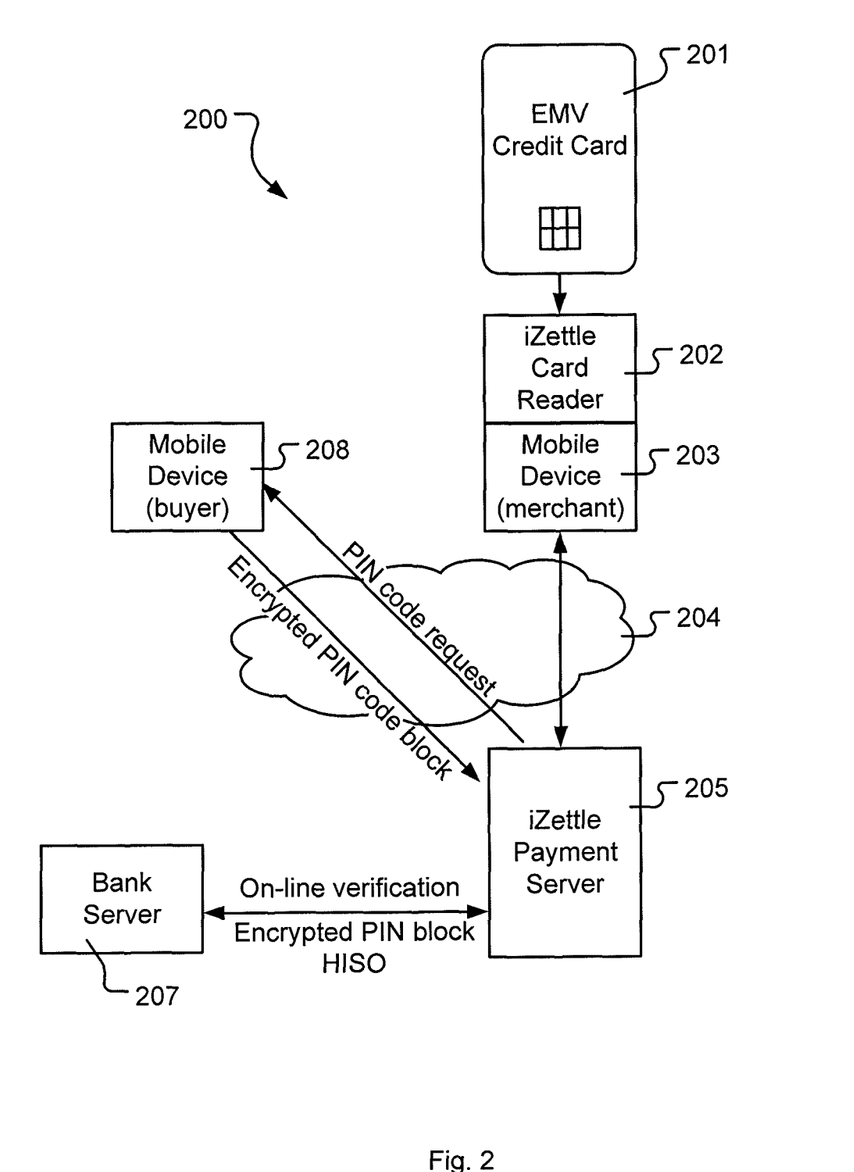
FIG. 2 shows a block diagram of a system for conducting PIN authorized EMV payments using an ordinary mobile phone, according to an embodiment of the present invention.

FIG. 2 presents a secure payment system 200 according to an embodiment of the present invention in which a mobile phone (mobile device 203) may be used to conduct a secure PIN authorized EMV debit or credit card payment. To better understand the present invention, and the embodiments thereof, an example of how a credit card payment may be accomplished in the novel secure payment system 200 is presented below.

Figure 3A:
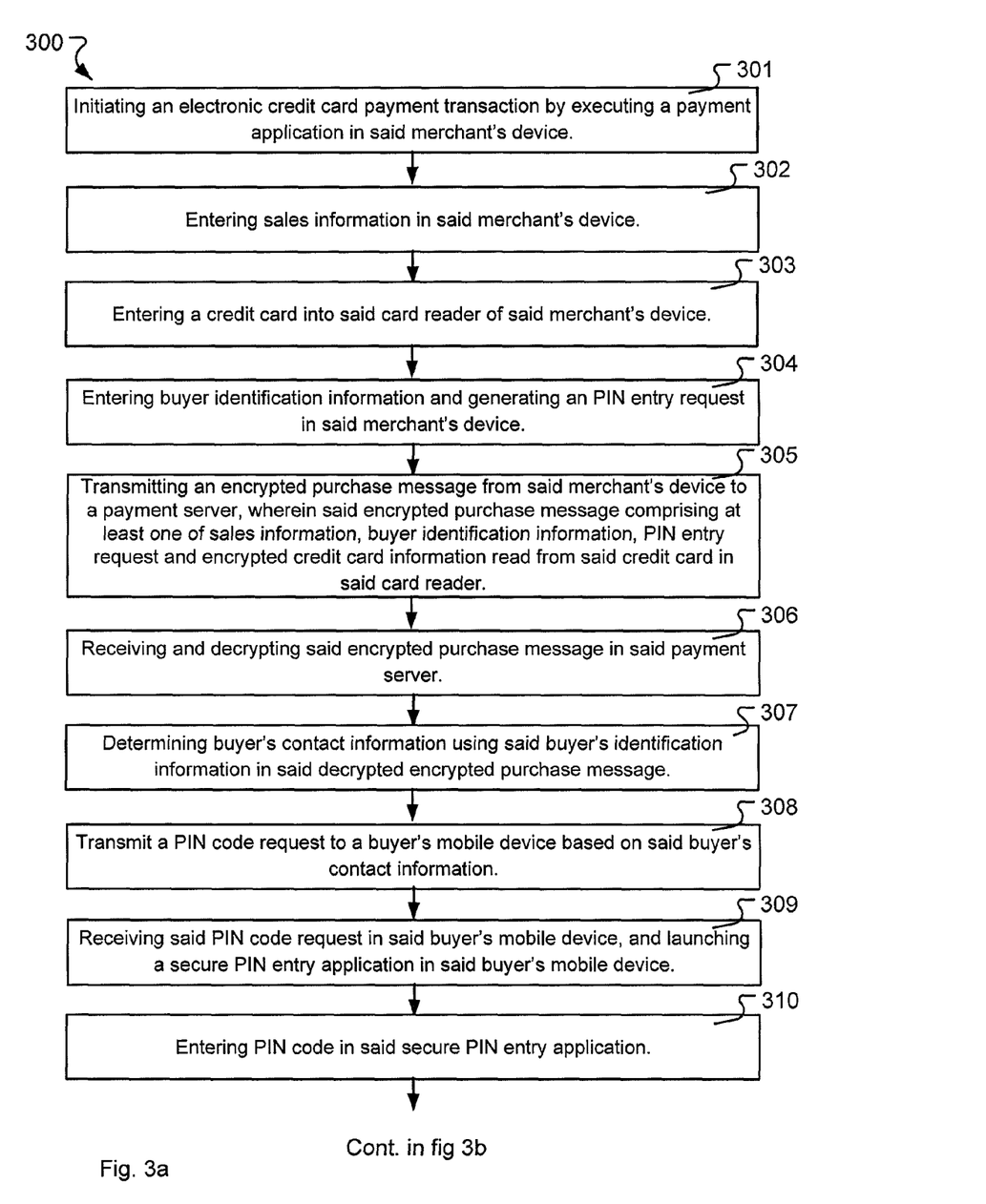
FIG. 3a shows a flowchart describing the steps in a method for conducting PIN authorized EMV payments using an ordinary mobile phone, according to an embodiment of the present invention.

When the buyer has made up his or her mind to purchase a product or to pay for a service, he or she contacts a merchant in order to complete the payment of the product or service. Thus in this case the payment acquirer is the merchant or the merchant's business that want to get paid for the product or service. A payment application is executed, and thereby initiating 301 an electronic credit card payment transaction 300 (see credit card payment method in FIG. 3), in the mobile phone 203 (the merchant's device 202,203), either before it is handed over from the merchant to the buyer or when the merchant enters the card reader 202 into the device 203 (and thus forming a merchant's device 202,203).

The merchant or the buyer enters sales information 301, which for example may be information about the product and the purchase amount (price), in said merchant's device. The sales information may also include information about the business selling the product or service, such as information usually found on receipts, GPS information pinpointing the store or the seller's geographical position, the sellers account at the payment server 205, the sellers account at the bank 207 or any other information which can be used to identify the seller and/or the place of sale. The sales information may also be read using a barcode reader, infrared reader or a near field communication (NFC) reader, integrated into the mobile phone 203, directly from the product (for instance the product tag) or from a catalogue listing products and their prices. In another variant, some or all of the sales information may be downloaded or self-generated from one or several servers connected to the merchant's device 202,203.

The buyer inserts his or her EMV credit card 201 into the payment card reader 303 (the merchant device 202,203) and thereby initiate a secure credit card payment transaction 300. The merchant hands his or hers mobile phone 203 with a payment card reader 202 attached to it (hereinafter referred to as the merchant device 202,203) to the buyer. The buyer is asked to enter buyer identification information 304 which for instance could be contact information such as his or her mobile phone number or email address into the payment application, if the buyer has not entered his or her phone number or email address before. The phone number and or email address are stored in the payment server 205 and associated with the EMV debit or credit card 201. If the phone number or email address has been entered before (i.e. have previously made a payment in the store), the user may in a variant not have to enter the same information again, unless he or she uses a different EMV payment card. The payment card reader 202 reads the encrypted EMV card information 201.

The method to complete the payment will be off-line PIN verification if the EMV payment card 201 supports off-line PIN verification 315,316. In case the EMV payment card 201 does not support off-line PIN verification, the method to complete the payment will be on-line PIN verification against the bank 207. If neither off- or on-line PIN verification is possible for any reason, the verification method may be signature entry.

The buyer identification information the buyer is requested to enter by the payment application running in the merchant's device 202, may also be any of: the buyer's mobile phone number, an e-mail address, postal address, a social security number, a one-time code, a signature, a pre-registered identification number, a photograph (taken by the camera in the mobile phone 203), biometric information (read or scanned by the mobile phone 203 or some adapter connected to the mobile phone 203) or any other information making it possible to identify the buyer in question.

In a first embodiment the buyer will verify the payment using his PIN code associated with the EMV card 201 he or she is paying with, and therefore the buyer will also, in the payment application, receive a PIN entry web page link in the buyer's mobile device 208. This step is same in both the case where on-line and off-line PIN verification is applied. Since the buyer will verify the payment using his PIN code associated with the EMV card 201 a PIN entry request is generated by the payment application.

When the buyer has completed the task of inputting buyer identification information 305, an encrypted purchase message is transmitted from the merchant's device 202,203, wirelessly (or by wire) over the Internet 204, to a payment server 205. The encrypted purchase message may contain any or all of the following encrypted information:
    the buyer identification information,
    the PIN entry request,
    the sales information and
    the encrypted credit card information
read by the card reader 202 from the buyer's EMV card 201. In a variant only the buyer identification information and the credit card information are encrypted and the PIN entry request and the sales information are transmitted in plain text to the payment server 205. The transmission over the Internet 204 may or may not be encrypted using standard Secure Socket Layer technique.

The payment server 205 receives the encrypted purchase message 306 coming from the merchant's device 202,203 and decrypts the content of the purchase message and temporarily stores the encrypted credit card information and the sales information.

In a variant of the embodiment of the present invention the payment server 205 may then verify that the information related to the merchant's account either on the payment server 205 or at the bank server 207 is legitimate and not black listed for any reason. The verification may either be done with the bank server 207 directly or it may be checked against a register in the payment server 205 which may be updated regularly against the bank server's register 207.

The buyer identification information (and/or the credit card information) is used to determine buyer's contact information 307 either registered in the payment sever 205. The buyer's contact information may for instance be an email address, a mobile phone number, social network identification (such as Facebook or LinkedIn id) or any other information that can be used to get in touch with the buyer. In this example the received pre-registered buyer identification information is a mobile phone number to the buyer's mobile phone. In a variant the buyer's contact information is supplied in said buyer identification information and not stored in said payment server.

The payment server 205 may then transmits a PIN code request 308 to the buyer's mobile device 208 using the buyer's contact information (for instance the mobile phone number). The transmission of the PIN code request to the buyer's mobile device 208 may be done over the Internet 204. The Internet connection may be over the mobile phone network, Wi-Fi, or connected to a fixed line Internet connection. The transmission over the Internet 204 may or may not be encrypted using standard Secure Socket Layer technique.

In a variant, the payment server 205 may also verify that the PIN entry request is legitimate by for instance comparing the geographical positions of the merchant's device and the buyer's mobile phone 208. This approach requires that both the merchant's device 202,203 and the mobile device 208 transmit their location to the payment server 205 for comparison. The buyer may for instance initiate the payment by transmitting the mobile device's 208 coordinates to the payment server 205, and the merchant's coordinates may either be pre-registered in the payment server 205 (a store usually do not change location that often) or it may be included in the encrypted purchase message transmitted from the merchant's device 202,203, wirelessly (or by wire) over the Internet 204, to the payment server 205.

The PIN code request may in a variant contain information (such as written verification information) to the buyer that the PIN code should only be entered in case that the buyer was the one that initiated the secure EMV card payment transaction.

When the PIN code request is received in the buyer's mobile device 208,3409 a secure PIN entry application is launched. The secure PIN entry application running in the buyer's mobile device 208 could be implemented as an encrypted web interface that is uniquely encrypted for each PIN input occasion. The web interface could be surfaced in a secure application, which establishes a secure and encrypted communication channel between the mobile device 208 and the payment server 205, other than the mobile phone's web browser to minimize the risk of tampering with the software. The secure PIN entry application could in this case be a dedicated web browser tailored to decrypt the PIN input web component and ensure secure input of the PIN code 310.

In a variant, a secure PIN entering web page (from hereinafter also referred to as a secure PIN entry application) in the buyer's mobile device 208 establishes a secure and encrypted connection with the payment server 205 and will encrypt the PIN code asymmetrically, using the EMV payment card's 202 public key.

Alternatively, a secure PIN entry application could be a compiled application, launched in the buyer's otherwise unsecure mobile device 208, running on the mobile device operating system. The mobile phone operating system could be any of iOS, Android, Windows Phone, Linux or another mobile phone OS. The secure PIN entry application in the buyer's mobile device 208 establishes a secure and encrypted connection with the payment server 205.

The secure PIN entry application launched in the buyer's mobile device 208 creates a secure environment in the mobile phone by for example using a web based sandbox technique. In this way the buyer may safely enter his or her PIN code 311 without the risk of a malicious third party program intercepting it. The actual representation of numbers and/or letters in the PIN entry application could be uniquely created, using a secure key such as the EMV payment card's 201 public key, for the occasion by the payment server and will not be re-used, meaning that even if the communication between the PIN entry application in the mobile device 208 and the payment server 205 is intercepted and decrypted, the numbers and/or letters are only meaningful when combined with a secure key in the payment server 205.

The buyer may also be associated or contribute with certain security information, such as the current geographic location of the buyer's mobile device 208, a transaction ID, mobile device's IMEI number, MSISDN number, social security number, signature, biometric information and/or other security information that may be unique to the user. If the geographic location of the merchant's device 202,203 is stored or known in the payment server 205 (see above for a discussion regarding how this can be achieved), the positions of the merchant's device and the buyer's mobile phone could be compared to ensure that the payment is completed at the same location or at pre-approved locations.

The PIN code entered by the buyer in the secure PIN entry application launched in the buyer's mobile device 208 is encrypted into a PIN code block. If more information than the PIN code is to be transmitted to the payment server 205,312, the buyer security information is encrypted separately at the moment of entry and not sent in the same package to the payment server 205. The encrypted PIN code block is transmitted from the buyer's mobile device 208 to the payment server 312 over the Internet 204. The encryption used in the mobile device 208 may fulfill the requirements of worldwide standards of security of online transfer of credit card details. The encryption may be further enhanced by using Secure Socket Layer technique for the transmission over the Internet 204.

The payment server 205 receives the encrypted PIN code block 313 and, if available, the buyer security information from the mobile device 208. The payment server 205 decrypts and stores the buyer security information, if it is present. The payment server 205 may in a variant compare the buyer security information with already stored buyer security information or with the buyer identification information to determine if the buyer is legitimate or not.

The verification PIN code may be done either on-line with the bank or off-line 314 against the information stored in the credit card in the merchant's credit card reader. Whether to do an on-line or an off-line verification may be determined in several different ways 314. One way is that it is decided (for instance chosen from a menu or based on connectivity information from the payment server) in the merchant's device 202,203 when initiating the payment or it may be automatically decided in the payment server 205 (depending on the current connectivity to the bank server 207 or depending on a setting in the payment server 205).

Figure 3B:
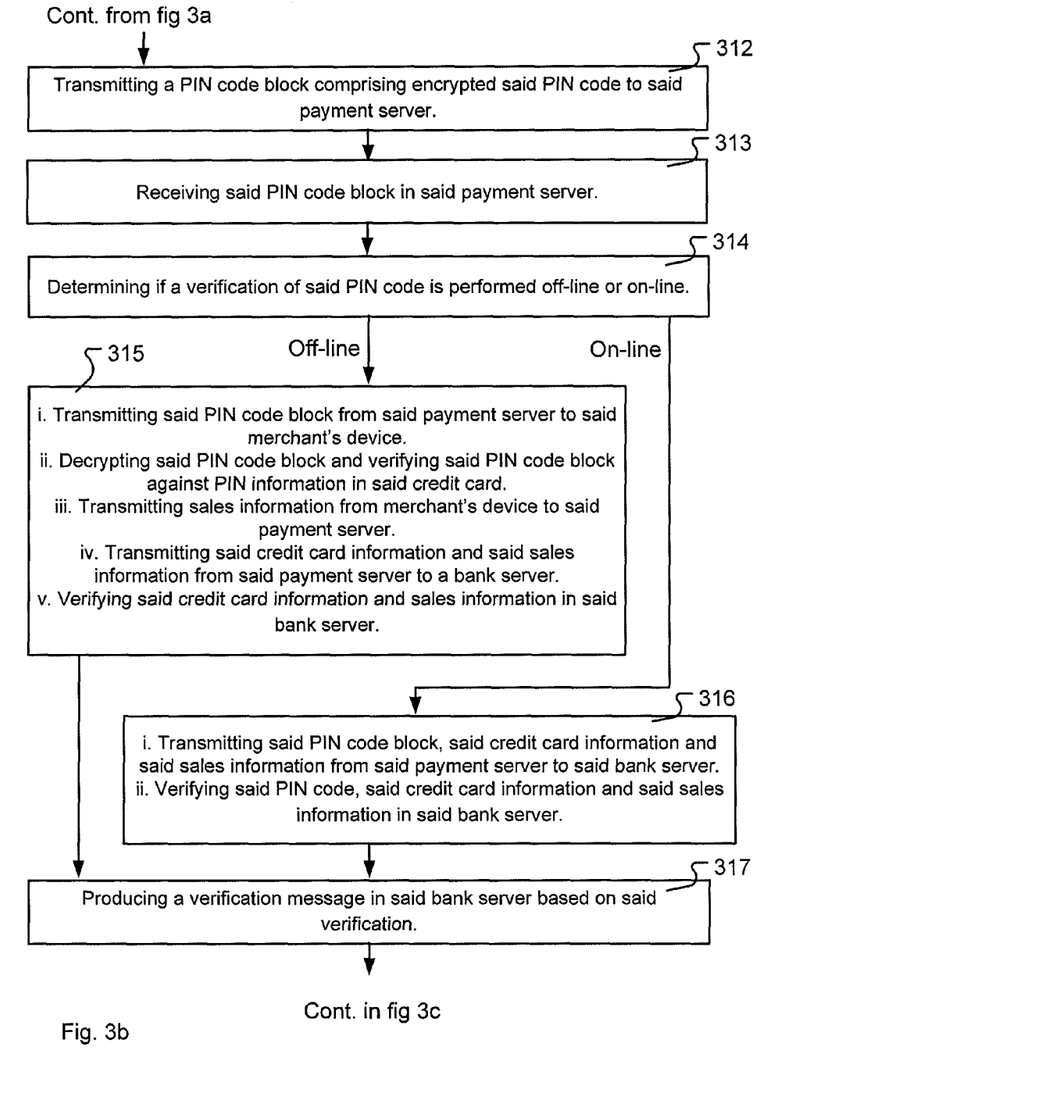
FIG. 3b shows a flowchart which is a continuation of the flowchart in FIG. 3a, according to an embodiment of the present invention.

In case the PIN code verification is determined to perform an off-line verification 315, the payment server 205 will send the encrypted PIN code block to the merchant card reader 202 for verification using the secure chip on the EMV payment card 201. The PIN code block is decrypted in said card reader and verified against PIN information in said inserted credit card. The encryption method used in the transmission fulfills the requirements of worldwide standards of security of online transfer of credit card details.

In the case when the PIN code is verified in the credit card, the purchase amount still needs to be verified against the bank account at a bank server 207. The verification of the purchase amount is carried out by sending the sales information with the purchase amount from the merchant's device 202,203 to the payment server 205 where the authorization of the amount is carried out by sending the credit card information and the sales information in an encrypted format over a secure socket layer communication with an encryption method fulfilling the requirements of worldwide standards of security of online transfer of debit or credit card information, to the bank server 207. The bank server 207 verifies if the purchase amount is chargeable or not, and transmits a purchase verification message 317 over a secure socket layer communication back to the payment server 205, 318.

Figure 3C:
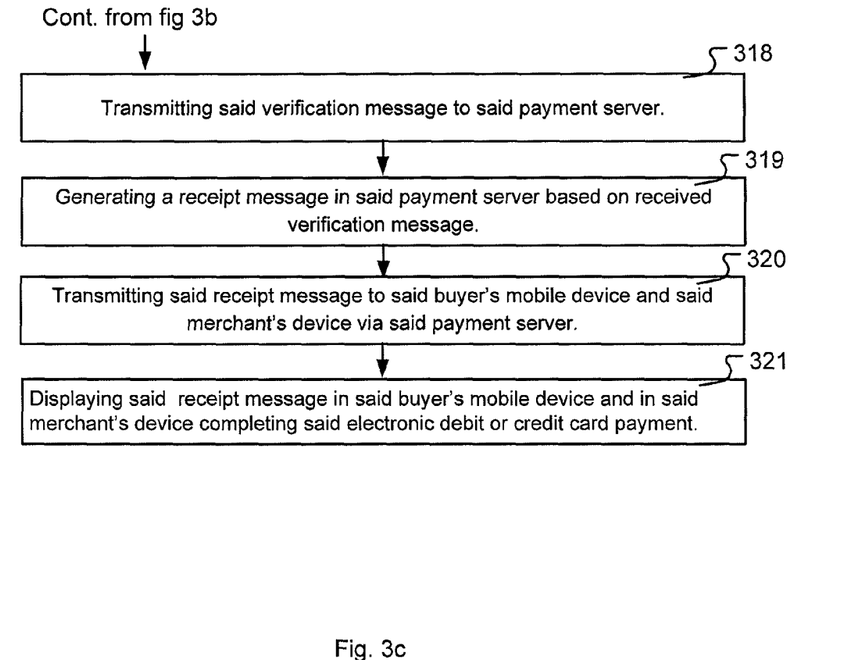
FIG. 3c shows a flowchart which is a continuation of the flowchart in FIG. 3a, according to an embodiment of the present invention.

In case the PIN verification is determined to perform an on-line verification 316, the payment server 205 will transmit the previously received and stored encrypted PIN code block, sales information together with the credit card information, to the bank server 207 for on-line verification. The transmission is encrypted with a method that fulfills the requirements of worldwide standards of security of online transfer of credit card details through a secure socket layer. The bank server 207 receives the encrypted credit card information, sales information (with the purchase amount), and encrypted PIN code block, decrypts them, and verifies the PIN code. The bank server 207 completes the on-line verification by transmitting a verification message 317 to the payment server 205,318 with a verification stating that the PIN code is approved. The communication with the bank server 207 occurs in accordance with the EMV standard meaning that interactions with the bank. The sales information is transferred to the bank as one part of the communication to verify the purchase amount with the buyer's bank account and the encrypted PIN block and the credit card information as another part of the communication. The bank acknowledges that the sales information (the amount) is chargeable as one part of the communication and that the PIN block and the credit card information is correct, as another.

When the payment server 205 has received the verifications regarding the PIN code and the amount, the payment server 205 will generate a receipt message 319 as proof of the transaction. The buyer and the merchant will then get the receipt message, transmitting said receipt message to said buyer's mobile device and said merchants' device via said payment server 320, informing them that the transaction is approved by one or several of the following: in a dedicated application, by SMS, by MMS, by email, by instant messaging or any other communication method accessible from a mobile phone 203,208. The receipt message sent from the payment server 205 is, when received by the merchant's device 202,203 and the buyer's mobile device 208, displayed on the device's displays 321, thus indicating that the payment has been received and is correct.

If any of the verification steps mentioned in above description goes wrong, is denied or faulty, an error message is generated and transmitted to the merchant's device or the buyer's mobile device 208, or both, and the payment process is terminated or interrupted.

The receipt message may also be stored on the payment server 205 and may be accessed by the buyer and/or the merchant at a later point in time using for instance a web browser connecting to the payment server 205. The receipt message may also be accessed by ordering it from (thus the payment server would send it out) or directly accessing it on the payment server 205 using the merchant's device or the buyer's mobile device 208.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A method of conducting electronic credit card payments to a payment acquirer using a merchant's device, a buyer's mobile device and a payment server, the merchant's device comprising a card reader and a mobile phone, said method comprising:

initiating an electronic credit card payment transaction by executing a payment application in said merchant's device;

entering sales information in said merchant's device;

entering a credit card into said card reader of said merchant's device;

entering buyer identification information and generating a Personal Identification Number (PIN) entry request in said merchant's device;

transmitting an encrypted purchase message from said merchant's device to a payment server, wherein said encrypted purchase message comprises a PIN entry request and at least one of sales information, buyer identification information and encrypted credit card information read from said credit card in said card reader;

receiving and decrypting said encrypted purchase message in said payment server;

determining, in the payment server, said buyer's contact information using said buyer's identification information in said decrypted encrypted purchase message;

transmitting, from said payment server, a PIN code request to a buyer's mobile device based on said buyer's contact information;

receiving said PIN code request in said buyer's mobile device, and launching a secure PIN entry application in said buyer's mobile device;

entering a PIN code in said secure PIN entry application;

encrypting the entered PIN code in the buyer's mobile device;

transmitting a PIN code block comprising said encrypted PIN code to said payment server;

receiving said PIN code block in said payment server;

determining, in said payment server, if a verification of said PIN code is performed off-line or on-line, wherein said off-line verification comprising the steps:

i. transmitting said PIN code block from said payment server to said merchant's device;

ii. decrypting, in said merchants device, said PIN code block and verifying said PIN code block against PIN information in said credit card;

iii. transmitting sales information from merchant's device to said payment server;

iv. transmitting said credit card information and said sales information from said payment server to a bank server;

v. verifying said credit card information and sales information in said bank server;

wherein said on-line verification comprising the steps:

i. transmitting said PIN code block, said credit card information and said sales information from said payment server to said bank server;

ii. verifying said PIN code, said credit card information and said sales information in said bank server;

producing a verification message in said bank server based on said verification;

transmitting said verification message from said bank server to said payment server;

generating a receipt message in said payment server based on received verification message;

transmitting said receipt message to said buyer's mobile device and said merchant's device via said payment server; and displaying said receipt message in said buyer's mobile device and in said merchant's device completing said electronic debit or credit card payment.

2. The method of conducting electronic credit card payments according to claim 1, wherein the step of entering PIN code in said secure PIN entry application also comprising:
entering buyer security information; and
encrypting said buyer security information and including it in said PIN code block.

3. The method of conducting electronic credit card payments according to claim 2, wherein the step of receiving said PIN code block in said payment server also comprising:
decrypting said buyer security information at said payment server, and verifying said buyer security information against said buyer identification information.

4. The method of conducting electronic credit card payments according to claim 1, wherein said buyer identification information may be any of: the buyer's mobile phone number, an e-mail address, postal address, a social security number, a signature, a one-time code, a pre-registered identification number, a photograph and biometric information.

5. The method of conducting electronic credit card payments according to claim 1, wherein said step of launching a secure PIN entry application in said buyer's mobile device entails launching an encrypted web interface that is uniquely encrypted for each PIN input occasion, or a dedicated web browser capable of decrypting the PIN input web component and ensuring secure input of the PIN code.

6. The method of conducting electronic credit card payments according to claim 1, wherein said transmission between said merchant's device and said payment server, between said payment server and said buyer's mobile device, and between said payment server and said bank server is encrypted using standard secure socket layer communication.

7. The method of conducting electronic credit card payments according to claim 1, wherein said receipt message is stored on the payment server, and is accessible by the buyer and/or the merchant using a web browser, the merchant's device or the buyer's mobile device .

8. A system for conducting electronic credit card payments comprising:
a merchant's device including a card reader and a mobile phone;
a payment server;
a buyer's mobile phone; and
a bank server, wherein said merchant's device, payment server, buyer's device and bank server have a transceiver and a processor,
wherein said merchant's device is configure to initiate an electronic credit card payment transaction by executing a payment application, the payment application including logic configured to
receive entry of sales information,
receive data from a credit card into said card reader,
receive entry of buyer identification information and
generate a Personal Identification Number, PIN, entry request, and
transmit an encrypted purchase message from said merchant's device to the payment server, wherein said encrypted purchase message comprises a PIN entry request and at least one of sales information, buyer identification information and encrypted credit card information read from said credit card in said card reader,
wherein said payment server is configured to
receive and decrypt said encrypted purchase message,
determine said buyer's contact information using said buyer's identification information in said decrypted encrypted purchase message, and
transmit, from said payment server, a PIN code request to a buyer's mobile device based on said buyer's contact information,
wherein said buyer's mobile device is configured to
receive said PIN code request and launch a secure PIN entry application,
receive a PIN code in said secure PIN entry application,
encrypt the entered PIN code, and
transmit a PIN code block comprising said encrypted PIN code to said payment server,
wherein said payment server is configured to
receive said PIN code block,
determine if a verification of said PIN code is performed off-line or on-line,
wherein said off-line verification comprises
wherein said payment server is configured to
transmit said PIN code block from said payment server to said merchant's device,
wherein said merchant's device is configured to
decrypt said PIN code block and verify said PIN code block against PIN information in said credit card,
transmit sales information from merchant's device to said payment server,
wherein said payment server is configured to
receive said sales information from said merchant's device,
transmit said credit card information and said sales information from said payment server to a bank server,
wherein said back server is configured to
verify said credit card information and sales information;
wherein said on-line verification comprises
wherein said payment server is configured to
transmit said PIN code block, said credit card information and said sales information from said payment server to said bank server,
wherein said bank server is configured to
verify said PIN code, said credit card information and said sales information,
wherein said bank server is configured to
produce a verification message based on said verification,
transmit said verification message from said bank server to said payment server,
wherein said payment server is configured to
generate a receipt message based on received verification message, and
transmit said receipt message to said buyer's mobile device and said merchant's device via said payment server,
wherein said buyer's mobile device and said merchant's device are configured to display said receipt message completing said electronic debit or credit card payment.

* * * * *